US012611853B2

(12) United States Patent
Sennik

(10) Patent No.: US 12,611,853 B2
(45) Date of Patent: Apr. 28, 2026

(54) WATERPROOF SHEET FOR FORMING A SLAB GUARD

(71) Applicant: DMX Membranes Limited, Brampton (CA)

(72) Inventor: Sundeepan Sennik, Thornhill (CA)

(73) Assignee: DMX Membranes Limited, Brampton (CA)

( * ) Notice: Subject to any disclaimer, the term of this patent is extended or adjusted under 35 U.S.C. 154(b) by 0 days.

(21) Appl. No.: 18/963,604

(22) Filed: Nov. 28, 2024

(65) Prior Publication Data

US 2025/0187320 A1 Jun. 12, 2025

Related U.S. Application Data

(60) Provisional application No. 63/606,833, filed on Dec. 6, 2023.

(51) Int. Cl.
| | |
|---|---|
| *B32B 3/10* | (2006.01) |
| *B32B 5/02* | (2006.01) |
| *B32B 7/04* | (2019.01) |
| *B32B 27/12* | (2006.01) |
| *B32B 27/32* | (2006.01) |
| *B32B 37/18* | (2006.01) |
| *B32B 37/24* | (2006.01) |
| *B32B 37/26* | (2006.01) |

(52) U.S. Cl.
CPC .............. *B32B 27/12* (2013.01); *B32B 5/022* (2013.01); *B32B 7/04* (2013.01); *B32B 27/32* (2013.01); *B32B 37/182* (2013.01); *B32B 2037/243* (2013.01); *B32B 2037/268*

(2013.01); *B32B 2305/18* (2013.01); *B32B 2307/7265* (2013.01); *B32B 2405/00* (2013.01)

(58) Field of Classification Search
None
See application file for complete search history.

(56) References Cited

U.S. PATENT DOCUMENTS

| | | | |
|---|---|---|---|
| 4,870,796 A | * | 10/1989 | Hart ........................ E04D 11/02 |
| | | | 52/409 |
| 4,994,328 A | | 2/1991 | Cogliano |

(Continued)

FOREIGN PATENT DOCUMENTS

| | | | |
|---|---|---|---|
| JP | 2021155959 A | * | 10/2021 |

OTHER PUBLICATIONS

Machine translation of JP-2021155959-A (Year: 2021).*

(Continued)

*Primary Examiner* — Christopher M Polley
(74) *Attorney, Agent, or Firm* — SMART & BIGGAR LP; James Raakman

(57) ABSTRACT

A waterproof sheet for forming a slab guard includes a waterproof support membrane having a membrane top surface extending between a membrane first end and a membrane second edge opposite the membrane first end. The waterproof sheet further includes a fabric layer overlying the membrane top surface and bonded to the membrane top surface, the fabric layer including an overhang portion extending beyond the waterproof support membrane past the membrane second end, for overlying the fabric layer of an adjacent sheet to provide a continuous exposed fabric surface bridging across the first sheet and the adjacent sheet.

14 Claims, 6 Drawing Sheets

(56)            References Cited

U.S. PATENT DOCUMENTS

| 5,316,848 | A | 5/1994 | Bartlett | | |
| 7,179,761 | B2 | 2/2007 | Malik | | |
| 2014/0072751 | A1* | 3/2014 | Bradenburg | ............. | E04D 5/02 |
| | | | | | 442/72 |

OTHER PUBLICATIONS

Zhou, 7.5m-8m width PE HDPE Geomembrane Liner Sheet Water-proof Sheet Extrusion Machine, Mar. 2023, <https://www.linkedin.com/pulse/75m8m-width-pe-hdpe-geomembrane-liner-sheet-waterproof-lilly-zhou/> (9 pages).

* cited by examiner

300

302 Laying out a First Sheet

304 Removing a Release Film

306 Laying out a Second Sheet

308 Joining the First and Second Sheets

310 Forming a Continuous Exposed Fabric Surface

312 Applying a Fluid Waterproofing Material

314 Forming a Concrete Wall

WATERPROOF SHEET FOR FORMING A SLAB GUARD

RELATED APPLICATIONS

This application claims the benefit of U.S. Provisional Patent Application No. 63/606,833 filed Dec. 6, 2023, the entirety of each of which is incorporated herein by reference.

FIELD

The specification relates generally to slab guards for waterproofing flat surfaces, and more specifically, to waterproof sheets for forming slab guards.

BACKGROUND

U.S. Pat. No. 7,179,761 (Malik) discloses a bituminous water vapor retarder of the type which can be used under concrete slabs in contact with soil or granular fill. The vapor barrier is a multi-ply weather coated permanently bonded semi-flexible bituminous core board composed of the homogeneous high melt point bituminous material in combination with an exclusive core suspended midpoint in the board. This core is sealed under heat and pressure between liners of asphalt and impregnated felt and a glass mat liner, and an asphalt weather coat is applied to the glass mat liner and covered with a polyethylene anti-stick sheet.

U.S. Pat. No. 5,316,848 (Bartlett) discloses a waterproofing membrane comprising a carrier, a synthetic adhesive coated on one face of the carrier substrate, and a protective layer coated on the synthetic adhesive. Bartlett also discloses post cast concrete structures comprising a waterproofing membrane adhered to all or part of the exposed surface of said structure, wherein said membrane comprises a carrier, a synthetic adhesive coated on one face of the carrier substrate, and a protective coating on the synthetic adhesive and wherein the protective coating face contacts said structure. Bartlett also discloses a method of waterproofing post cast concrete structures comprised of affixing a carrier to the inside of a concrete form and post casting concrete, wherein the carrier further comprises a synthetic adhesive coated with a protective coating.

U.S. Pat. No. 4,994,328 (Cogliano) discloses adhesive, waterproof membranes capable of adhering to freshly poured concrete compositions upon curing. The waterproof membranes comprise a bituminous sheet having at least one major surface coated with a non-tacky polymeric coating composition which contains a water-insoluble polymer, and optionally a filler capable of absorbing or reflecting infrared or ultraviolet radiation and/or a plasticizer. Suitable water-insoluble polymers include alpha-beta-ethylenically unsaturated carboxylic acid polymers or polyvinyl alcohol polymers.

SUMMARY

The following summary is intended to introduce the reader to various aspects of the applicant's teaching, but not to define any invention.

According to some aspects, a slab guard includes a waterproof sheet comprising a waterproof support membrane and a fabric layer. The waterproof support membrane has a membrane top surface extending between a membrane first end and a membrane second end opposite the membrane first end. The fabric layer overlies the membrane top surface and is bonded to the membrane top surface. The fabric layer includes an overhang portion extending beyond the waterproof support membrane past the membrane second end to overlie a fabric layer of an adjacent waterproof sheet and transition a continuous exposed fabric surface formed by the fabric layers from the waterproof sheet to the adjacent waterproof sheet.

According to some aspects, a slab guard includes a waterproof sheet comprising a waterproof support membrane, an adhesive tape, and a fabric layer. The waterproof support membrane has a membrane top surface and a membrane underside surface spaced apart from the membrane top surface by a membrane thickness. The membrane top and underside surfaces each extend between a membrane first end and a membrane second end opposite the membrane first end. The waterproof support membrane includes a transparent portion at the membrane second end. The adhesive tape is bonded to the membrane top. The fabric layer overlies the waterproof membrane top surface and is bonded to the membrane top surface from a first location adjacent the adhesive tape to a second location spaced apart from the membrane second end. The fabric layer includes a free portion overlying the transparent portion of the waterproof support membrane and extending from the second location to the second end. The free portion is unbonded to the waterproof support membrane to be lifted away from the waterproof support membrane to uncover the transparent portion of the waterproof support membrane while an adhesive tape of an adjacent waterproof sheet is being applied to the membrane underside surface of the transparent portion.

In some examples, the overhang portion is a strip of fabric extending a generally constant distance beyond the membrane second end along the membrane second end. In some examples, the fabric layer is a non-woven fabric layer. In some examples, the fabric layer is heat-bonded to the membrane top surface. In some examples, the fabric layer is continuously bonded to the waterproof support membrane from the free portion to an end of the fabric layer adjacent the adhesive tape.

In some examples, the waterproof support membrane is an extruded membrane. In some examples, the waterproof support membrane is a high density polyethylene membrane. In some examples, the adhesive tape is mechanically bonded to the membrane top surface. In some examples, the adhesive tape is heat-bonded to the membrane top surface. In some examples, the adhesive tape is spaced from the fabric layer by an exposed strip of the membrane top surface.

In some examples, the fabric layer further comprises a free portion overlying an end strip of the waterproof support membrane at the membrane second end and unbonded to the waterproof support membrane, the overhang portion of the fabric layer extending outward from the free portion. In some examples, an adhesive tape is mechanically bonded to the waterproof support membrane at the membrane first end.

According to some aspects, a method of joining waterproof sheets for forming a slab guard comprises laying out a first sheet, laying out a second sheet, and forming a continuous fabric surface extending across the first and second sheets. The first sheet includes a waterproof support membrane and a fabric layer overlying the waterproof support membrane and mechanically bonded to the waterproof support membrane. The second sheet is laid out adjacent to the first sheet. The second sheet includes a waterproof support membrane and a fabric layer overlying the waterproof support membrane and mechanically bonded to the waterproof support membrane. The fabric layer of the second sheet includes an overhang portion extending beyond an end of the waterproof support membrane of the second sheet. Forming the continuous fabric surface extending across the first and second sheets includes arranging the overhang portion of the fabric layer of the second sheet overlapping the fabric layer of the first sheet.

In some examples, the method further comprises spray-applying a waterproofing material over the continuous fabric surface. In some examples, the method further comprises forming cement against the waterproofing material.

In some examples, the first and second sheets are laid out on a hot rubber layer with the continuous fabric surface in direct contact with the hot rubber layer.

In some examples, laying out the second sheet adjacent to the first sheet includes arranging the end of the waterproof support membrane of the second sheet and an end of the waterproof support membrane of the first sheet in an over-lapping manner and securing the ends together with an adhesive. In some examples, the adhesive includes a tape formed on one of the first and second sheets. In some examples, the method further comprises removing a release film from the tape prior to securing the ends together.

BRIEF DESCRIPTION OF THE DRAWINGS

The drawings included herewith are for illustrating vari-ous examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to mul-tiple or all of the apparatuses described below. It is possible that an apparatus or process described below is not an embodiment of any claimed invention. Any invention dis-closed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Figures 1, 2, 3:
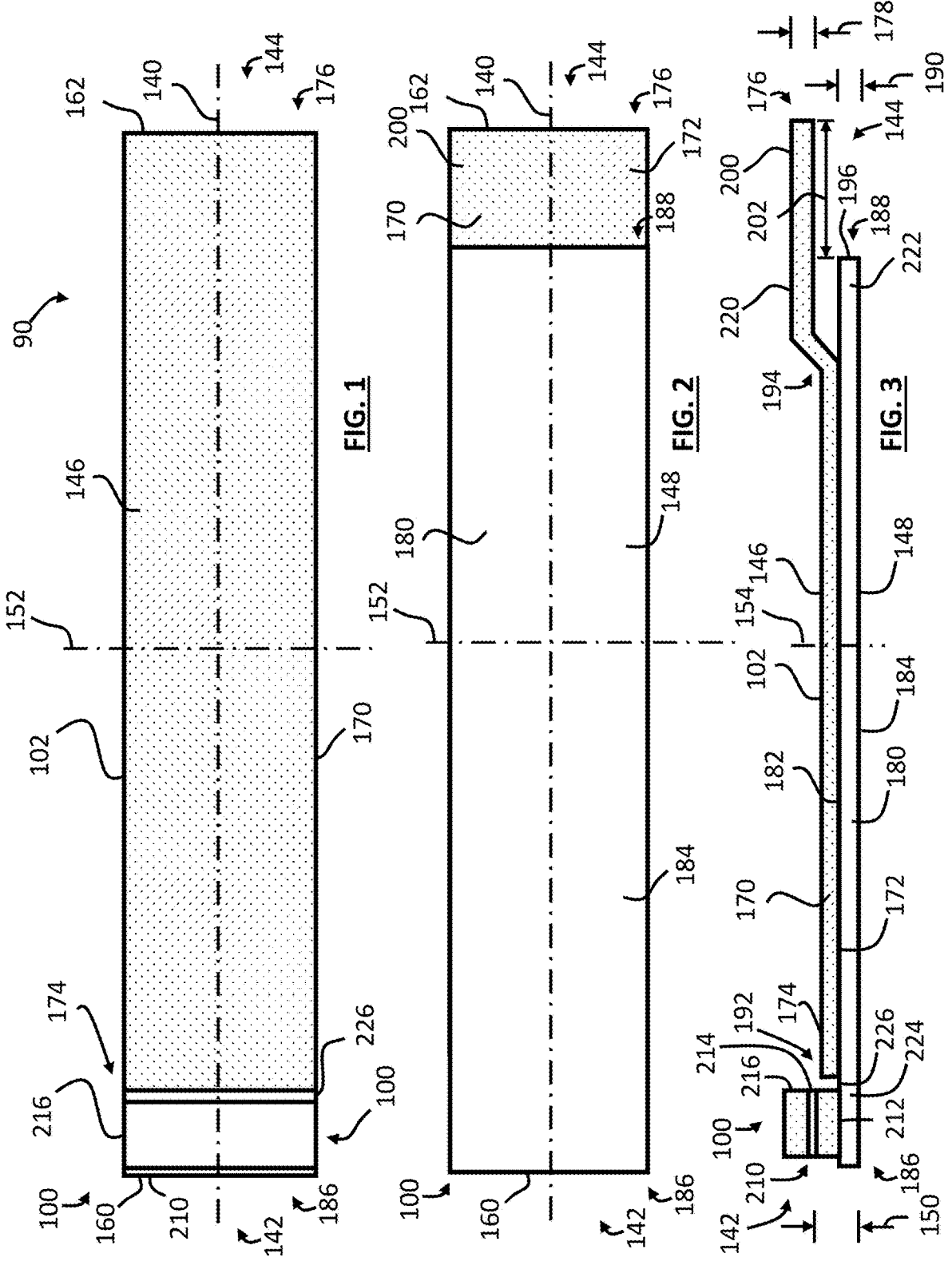
FIG. 1 is top view of an example of a slab guard comprising a waterproof sheet in accordance with one or more aspects of the teaching disclosed herein.
FIG. 2 is a bottom view of the waterproof sheet of FIG. 1.
FIG. 3 is a side elevation view of the waterproof sheet of FIG. 1.

Referring to FIGS. 1-3, an example waterproof sheet 100 for forming a slab guard 90 is shown. The slab guard 90 can be used to provide a waterproof barrier between an interior of a structure (e.g., a building) and an exterior of the structure. The slab guard 90 may be used in waterproofing a below-grade portion of the structure. When used in form-ing a waterproof barrier, the slab guard 90 helps to provide a moisture break between the interior (e.g., a below-grade space of a building) and the exterior (e.g., surrounding soil or fill). This can help prevent damage to the structure or contents of the structure due to ground water leakage into the structure. In some examples, the sheet 100 of the slab guard 90 forms an exposed fabric surface 102 to receive a fluid-applied waterproofing material (e.g., a spray-applied mate-rial or a poured hot rubber material). The fluid-applied waterproofing material is cured to form an overlying water-proof layer.

The slab guard 90 includes, in some examples, multiple sheets 100 in which a first sheet 100 is joined together with one or more further sheets to form an extended fabric surface for the fluid-applied waterproofing. In some examples, adja-cent sheets 100 present a continuous exposed fabric surface 104 (FIG. 11) to receive the fluid-applied waterproofing. This can facilitate forming a continuous waterproofing layer without gaps formed at joints between adjacent sheets 100. In some examples, the sheet 100 includes an adhesive for use in joining the sheet to an adjacent sheet, and the adhesive is mounted to a support layer of the sheet at one end of the sheet and the support layer includes an exposed transparent portion at an opposite end for receiving the adhesive of an adjacent sheet. The transparent portion can form a window to allow an installer to visually confirm that the sheets 100 have been properly joined via the adhesive tape. This can help formation of a strong connection between sheets during a first installation stage, before the fluid-applied waterproof-ing layer is applied, thereby avoiding a situation in which moisture (e.g. from the fluid-applied waterproofing) passes through the joint and wets the fabric, which may reduce the quality of a bond between the adhesive and an adjacent sheet.

Referring now to FIGS. 4 to 8, the sheet 100 is installed on a wall surface 110 of a wall 112 of a structure 114 (e.g., a building). The sheet 100 is used to form the slab guard 90 and provide a waterproof barrier over the wall 112, and may provide a waterproof barrier between an interior 116 and an exterior 118 of the structure 114.

In use, fluid-applied waterproofing material 130 is received on the exposed fabric surface 102 while the fluid-applied waterproofing material is in a fluid state, and the fluid-applied waterproofing material subsequently cures to form a waterproof layer 132. In the example illustrated, the waterproof layer 132 self-adheres by, e.g. mechanical and/or chemical bonding, to the exposed fabric surface 102 and to the wall surface 110. In the examples illustrated, the waterproof layer 132 secures the sheet 100 to the wall 112.

Figures 4, 5:
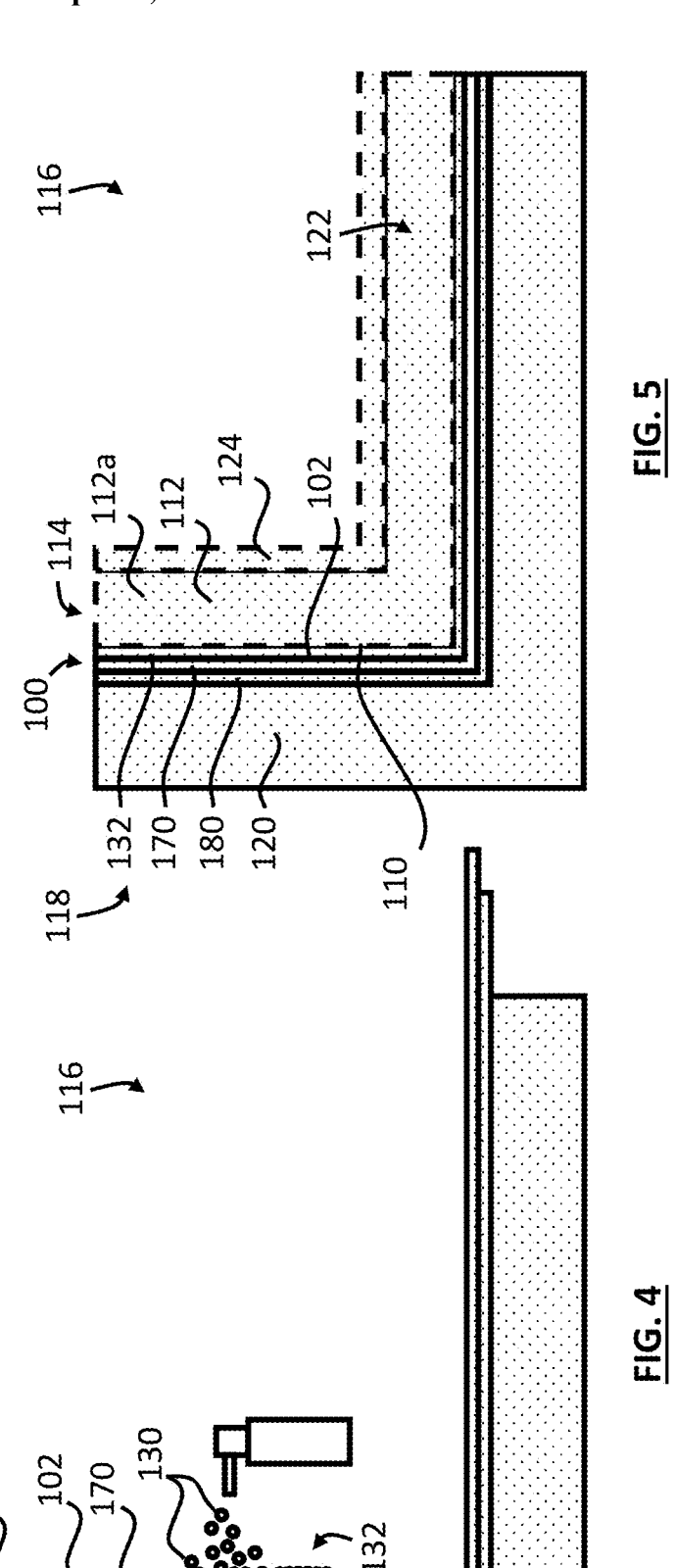
FIG. 4 is a cross-sectional view of the waterproof sheet of FIG. 1 laid out on an example form for a post-formed wall.
FIG. 5 is a cross-sectional view of the waterproof sheet of FIG. 1 in use in a first example waterproof barrier between the post-formed wall and the surrounding soil or fill.
Figure 6:
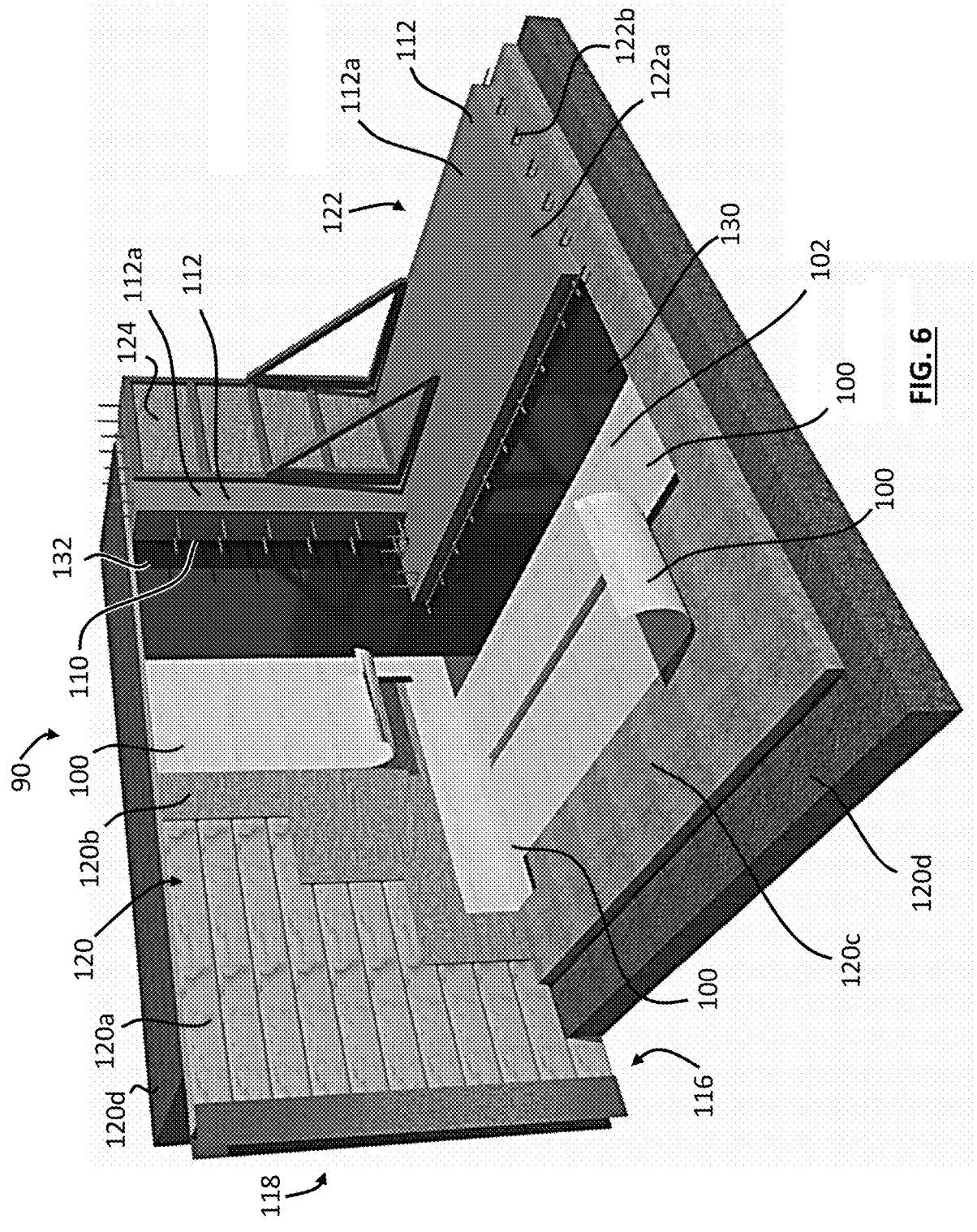
FIG. 6 is a perspective cut away view of the waterproof sheet of FIG. 1 in use in the first example waterproof barrier of FIG. 5.

Referring to FIGS. 4 to 6, the wall 112 is, in the example illustrated, a post-formed wall 112a. For use with a post-formed wall, the sheet 100 is laid out on a form 120 (e.g., lagging and backfill). Referring to FIG. 6, the form 120, in the example illustrated, includes lagging 120a and permanent formwork 120b and a concrete slab 120c. In the example illustrated, the form 120 is provided in an excavation and overlies a sidewall of the excavation, which can be of soil 120d or similar backfill.

In some examples, the form 120 includes generally horizontally extending surface over which the sheet 100 is laid out. In some examples, a horizontally-extending surface is formed of dirt or gravel. Referring to FIG. 6, in the example illustrated the horizontally-extending surface is a horizontally extending concrete slab. In some examples, the form 120 includes non-horizontally-extending surfaces (e.g., generally vertically extending surfaces in the example illustrated) over which the sheet 100 is laid out. In some examples, non-horizontally extending surfaces are formed of back-filled lagging or concrete.

In some examples, the sheet 100 is fastened to the form 120. In some examples, portions of the sheet 100 that are laid out over non-horizontally-extending surfaces of the form (e.g., generally vertically-extending portions) are fastened in place. In some examples, the sheet 100 is fastened to the form 120 by fasteners such as nails or screws passed through the sheet and into the lagging. Once the sheet 100 is laid out on the form, fluid-applied waterproofing material 130 is received on the exposed fabric surface 102.

Referring to FIGS. 4 to 6, in the example illustrated, the fluid-applied waterproofing material 130 is applied to the sheet 100. In the example illustrated, the fluid-applied waterproofing material 130 is sprayed onto the sheet 100 laid out on the form 120. After the fluid-applied waterproofing is applied, wall material 122 (e.g., concrete) is added against the sheet 100 over the fluid-applied waterproofing material 130 and the wall material 122 is cured to form the wall 112. Referring to FIG. 6, in the example illustrated the wall material 122 includes concrete 122a and rebar 122b. In some examples, the wall material 122 is held in position while curing by an inner form 124.

Figures 7, 8:
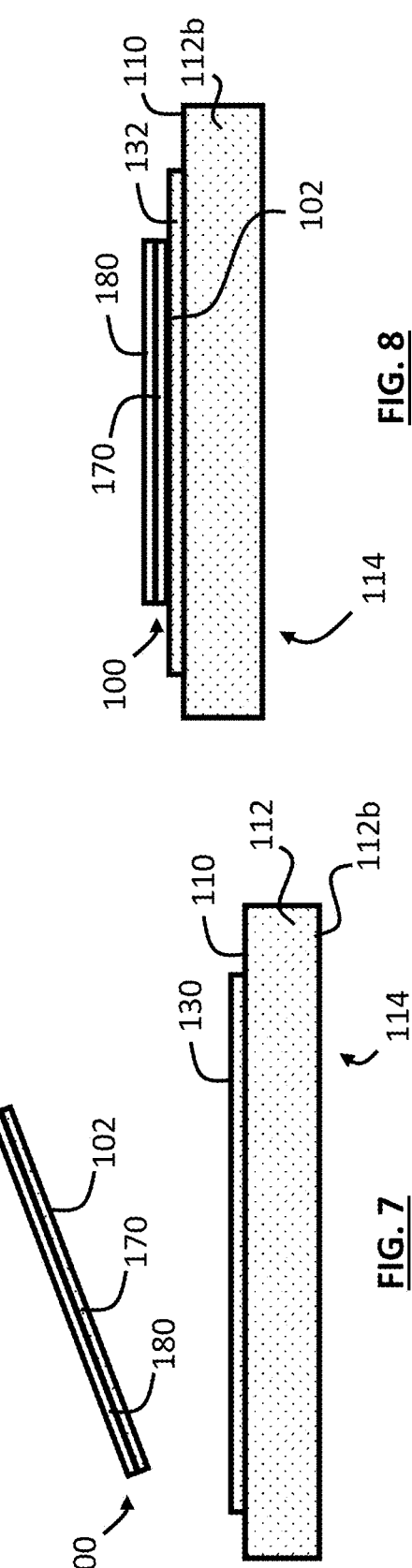
FIG. 7 is a cross-sectional view of the waterproof sheet of FIG. 1 being laid out on a fluid waterproofing material applied to a pre-formed wall.
FIG. 8 is a cross-sectional view of the waterproof sheet of FIG. 1 in use in a second example waterproof barrier over the pre-formed wall of FIG. 6.

Referring to FIGS. 7 and 8, the wall 112 is, in the example illustrated, a pre-formed wall 112b, and more particularly, a horizontally extending concrete slab. In some examples, the pre-formed wall 112b forms a generally vertically extending surface to which the sheet 100 is attached.

Referring to FIGS. 7 and 8, in the example illustrated, the fluid-applied waterproofing 130 is applied to the pre-formed wall 112b and the sheet 100 is then applied to the fluid-applied waterproofing 130. In the example illustrated, the fluid-applied waterproofing is in the form of molten (heated) rubber, and the sheet 100 is laid out on the fluid-applied waterproofing material 130. The sheet 100 is laid out with the exposed fabric surface 102 arranged to face the wall surface 110 (with the waterproofing 130 applied thereto). The exposed fabric surface 102 receives the fluid-applied waterproofing material 130. The fluid-applied waterproofing material 130 is received across the exposed fabric surface 102 and subsequently cured to form the waterproof layer 132 bonded to the fabric surface 102. In some examples, the fluid-applied waterproofing 130 is applied to the sheet 100 and the sheet 100 is then applied to the pre-formed wall 112b.

In a variant of the example of FIGS. 7 and 8, the fluid-applied waterproofing may be applied to a pre-formed roof surface, instead of a pre-formed wall (e.g. wall 112b). In such an example, the sheet 100 may be applied to the roof surface in a similar manner as previously described in reference to FIGS. 7 and 8, wherein the fluid-applied waterproofing 130 (e.g. molten heated rubber) is applied to the pre-formed roof surface, and the sheet 100 is laid out on the fluid-applied waterproofing material 130, with the exposed fabric surface 102 arranged to face the roof surface. In some examples, the fluid-applied waterproofing 130 is applied to the sheet 100 and the sheet 100 is then applied to the pre-formed roof surface.

Referring again to FIGS. 1-3, the sheet 100 has a lateral axis 140 extending between a sheet first end 142 and a sheet second end 144 opposite the sheet first end 142. A sheet top surface 146 extends between the sheet first end 142 and the sheet second end 144. The sheet 100 includes a vertical axis 154 extending between the sheet top surface 146 and a sheet underlying surface 148 opposite the sheet top surface 146. The sheet 100 has a sheet thickness 150 between the sheet top surface 146 and the sheet underlying surface 148. In the example illustrated, the sheet thickness 150 is generally constant. In some examples, the sheet thickness varies between the sheet first and second ends.

The sheet 100 also has a longitudinal axis 152 perpendicular to the lateral axis 140 and to the vertical axis 154. In some examples, the sheet 100 is provided as a roll. In some examples, the sheet 100 is rolled up along the longitudinal axis to form the roll. In the example illustrated, the sheet 100 is generally rectangular with a longest dimension along the lateral axis 140. In some examples, the dimension along the longitudinal axis 152 is larger than the dimension along the lateral axis 140 (e.g., 2 times, 5 times, or more than 10 times the size). This may facilitate rolling the sheet. A long longitudinal dimension may allow an installer to choose a length along the longitudinal axis 152 that is needed for a given application. Any excess length can be trimmed.

The sheet 100 has a sheet first edge 160 at the sheet first end 142 and a sheet second edge 162 at the sheet second end 144. In the example illustrated, the sheet first edge 160 and the sheet second edge 162 are generally parallel to one another.

The sheet 100 includes a fabric layer 170. The fabric layer 170 forms the exposed fabric surface 102 to receive the fluid-applied waterproofing material. The fabric layer 170 also includes an underlying surface 172 opposite the exposed fabric surface 102. The exposed fabric surface and the underlying surface 172 each extend between a fabric first end 174 and a fabric second end 176. The fabric layer 170 is a continuous layer presenting a continuous exposed fabric surface 102. In the example illustrated, the fabric layer 170 has a generally constant thickness 178 between the exposed fabric surface 102 and the underlying surface 172. In some examples, the thickness of the fabric layer 170 varies between the fabric first and second ends. In some examples, the fabric layer 170 is a layer of woven fabric. In some examples, the fabric layer 170 is a layer of non-woven fabric. In some examples, the fabric layer 170 includes or consists of one or more of polypropylene, polyethylene terephthalate, nylon, jute, and polyethylene.

The sheet 100 is, in the example illustrated, stiffened by a support layer 180. In some examples, the support layer 180 is puncture resistant to help prevent the fabric layer 170 from being torn. For example, the support layer can protect the fabric layer during installation, such as from protruding material (e.g., rocks) behind the fabric layer if the fabric layer is applied to a form, or from traffic (e.g., foot traffic) on top of the fabric layer if the fabric layer is laid on fluid waterproofing material (e.g., on a horizontal wall surface). The support layer includes a support top surface 182 and a support underlying surface 184 opposite the support top surface 182. The support top surface 182 and the support underlying surface 184 each extend between a support first end 186 and a support second end 188 opposite the support first end 186. In the example illustrated, the support layer 180 has a generally constant thickness 190 between the support top surface 182 and the support underlying surface 184. In some examples, the thickness of the support layer 180 varies between the support first and second ends 186, 188.

The support layer 180 includes or consists of a membrane. The membrane is a generally continuous membrane extending between the support first and second ends. In some examples, the membrane comprises a thermoplastic. In some examples, the membrane comprises or consists of a polyolefin (e.g., one or more of polyethylene, polypropylene, polyethylene terephthalate (PET), polystyrene, thermoplastic elastomers (TPE), thermoplastic polyolefins (TPO), and polyvinyl chloride (PVC)). In some examples, the membrane comprises or consists of polyethylene. In some examples, the membrane comprises or consists of high density polyethylene (HDPE). In some examples, the membrane is an extruded membrane.

The fabric layer 170 overlies the support layer 180. In the example illustrated, the fabric layer 170 is bonded directly to the support layer 180. In some examples, the fabric layer 170 is mechanically bonded to the support layer 180. In the example illustrated, the fabric layer 170 is heat-bonded to the support layer 180. In the example illustrated, the fabric layer 170 is bonded to the support layer 180 from a first location 192 towards the sheet first end 142 to a second location 194 towards the sheet second end 144. In the example illustrated, the second location 194 is spaced apart from the sheet second end 144. In some examples, the first location 192 is spaced apart from the sheet first end 142. In some examples, the fabric layer 170 is continuously bonded to the support layer 180 from the first location 192 to the second location 194.

In the example illustrated, the fabric layer 170 includes an overhang portion 200 that extends out beyond the support layer 180. The overhang portion 200 extends past the support second end 188. In use, an edge of a first sheet may be overlapped with an edge of an adjacent second sheet with an adhesive between the overlapped edges to join the sheets, and the overhang portion of the fabric layer of one of the sheets overhangs the edge of that sheet to be folded over to overly the fabric layer of the other sheet so that the fabric layers of the two sheets provide the slab guard 90 with a continuous fabric surface to receive the fluid-applied waterproofing. The fabric layer 170 includes the overhang portion 200 to transition the fabric surface 102 of a first sheet 100 past the laterally-directed peripheral face 196 of the support layer 180 of the first sheet and to the fabric layer of an adjacent, second, sheet. If neither of the first and second sheets included an overhang portion, the fabric surface may be interrupted (e.g., by the laterally directed peripheral face of the support layer of one of the sheets), which may result in poor adhesion of the fluid-applied waterproofing and an eventual leakage point through the joint between sheets 100 of the slab guard 90.

In the example illustrated, the overhang portion 200 extends a generally constant distance beyond the support second end 188, and more particularly, the overhang portion forms a strip of fabric of a generally constant overhang portion width 202 along the lateral axis 140 when the sheet 100 is drawn out along the lateral axis 140. The overhang portion width 202 is at least a multiple of the thickness 190 of the support layer 180. This provides width to transition the exposed fabric surface 102 from one sheet to another when the sheets are lapped along ends thereof. In some examples, the overhang portion width 202 is at least times the thickness 190. In some examples, the overhang portion width 202 is at least 10 times the thickness 190. In some examples, the overhang portion width 202 is at least 20 times the thickness 190.

In some examples, the sheet 100 includes an adhesive for use in securing the sheet 100 to an adjacent sheet. The adhesive is at an end of the sheet 100 to join the end to an adjacent sheet. In the example illustrated, the sheet 100 includes an adhesive tape 210 bonded to the support layer 180. In some examples, the adhesive tape 210 is adhesively bonded to the support layer 180. In some examples, the adhesive tape 210 is mechanically bonded to the support layer 180. In some examples, the adhesive tape 210 is a fabric tape. In the example illustrated, the adhesive tape 210 is a fabric tape with a fabric layer 212 heat bonded to the support layer 180 and an adhesive layer 214 applied to the fabric layer 170. In some examples, the adhesive tape 210 includes a release film 216 over the adhesive layer 214. The release film can protect the adhesive until the installer is ready to join the first sheet 100 to an adjacent, second, sheet 100. The release film 216 is peeled off to expose the adhesive.

In the example illustrated, the adhesive tape 210 is at an end of the sheet 100 that is generally opposite to an end from which the overhang portion 200 of the fabric layer 170 extends. In some examples, the adhesive tape 210 is bonded to the support layer 180 at the support first end 186. In the example illustrated, the first location 192 is adjacent the adhesive tape 210. In the example illustrated, the adhesive tape 210 is a continuous tape running along the support first end generally parallel to a first edge 160 of the sheet 100. A continuous tape may help provide a continuous bonding of the sheet to an adjacent sheet to help prevent water from penetrating the slab guard 90 by working its way through the joint between adjacent sheets 100.

The adhesive tape 210 can be bonded, for example, to the support top surface 182 or to the support underside surface 184. In some examples, the adhesive tape 210 is bonded to the same surface as the fabric layer 170. In the example illustrated, the adhesive tape 210 is bonded to the support top surface 182.

Referring again to the second end 144 of the sheet 100, in some examples, the fabric layer 170 includes a free portion 220 overlying a second end strip 222 of the support layer 180. The free portion 220 is unbonded from the support layer 180. The free portion 220 extends to the overhang portion 210. The fabric layer 170 is unbonded at the second end 188 of the support sheet 180 such that the free portion 220 forms a flap which can be folded back from the underlying support layer 188. This allows an installer to fold back the free portion 220 of the fabric layer 170 during installation to access the support first end 186 of the support layer 180. When adjacent sheets 100 are joined with ends overlapped, the installer can lift (e.g., fold back) the free portion 220 of the fabric layer so that the fabric does not impede the joining of the sheets 100. Additionally, lifting the free portion 220 of the sheet 100 exposes the second end of the support layer for application of further materials as needed. If an installer needs to use caulking or needs to apply a spray to the second end of the support layer, the space is open and clear to accommodate such materials. In the example illustrated, the free portion 220 is at an end of the sheet that is generally opposite the end at which the adhesive is provided.

In the example illustrated, the fabric layer 170 is generally continuously bonded to the support layer 180 from the free portion 220 to the fabric first end 174 of the fabric layer 170. In some examples, generally all of the fabric layer 170 that overlies the support layer 180 is bonded to the support layer 180 aside from the free portion 220 at the support first end 186.

In some examples, the first end strip 222 of the support layer 180 is transparent. When adjacent sheets 100 are joined, the adhesive tape 210 of a first sheet may be joined to the first end strip 222 of a second sheet. This allows an installer to visually assess the adherence of the adhesive tape 210 of a first sheet 100 to the first end strip 222 of the adjacent second sheet 100 by viewing the tape through the first end strip of the second sheet. In the example illustrated, the adhesive tape 210 of the first sheet 100 is bonded to the support top surface 182 of the first sheet 100, to be applied to the support underlying surface 184 of the second sheet to join the two sheets together. In some examples, the whole support layer 180 is transparent (e.g., a transparent HDPE membrane), and the free portion 220 of the fabric layer 170 can be folded back to allow an installer to see through the first end strip 222.

Referring to FIG. 3, the fabric layer 170, in the example illustrated, terminates short of the support first end 186. A first end strip 224 of the support layer 180 is free of the fabric layer 170. The adhesive tape 210 is bonded to the first end strip 224. In some examples, the support layer 180 includes an exposed strip 226 between the adhesive tape 210 and the fabric first end 174 of the fabric layer 170. This helps ensure a clean joining of sheets since the fabric does not impede the adhesive tape 210 that is bonded to the support layer 180 at the support first end 186. Terminating the fabric layer short of the first end of the support layer 180 leaves a portion of the support layer 180 uncovered by the fabric layer 170. This can subsequently be covered, for example, to provide a continuous exposed fabric surface 102 by using the overhang portion 200 of an adjacent sheet 100 to cover the uncovered portion of the support layer 180.

Figures 9, 10, 11:
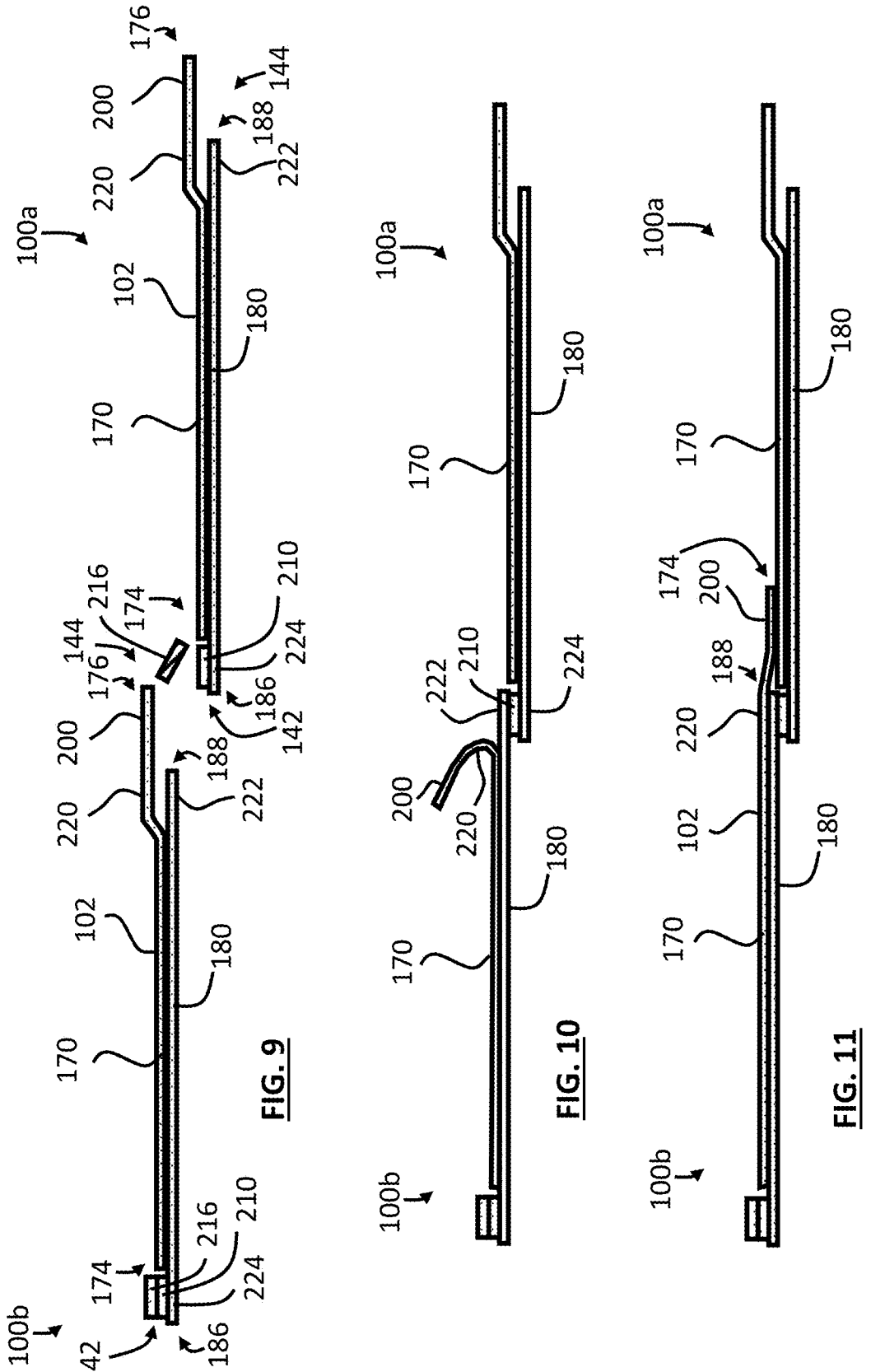
FIG. 9 is a side elevation view of a first of the waterproof sheet of FIG. 1 adjacent a second of the waterproof sheet of FIG. 1.
FIG. 10 is a side elevation view of the first and second waterproof sheets of FIG. 8 joined and a free portion of a fabric layer of the second waterproof sheet folded back from the support layer of the second waterproof sheet.
FIG. 11 is a side elevation view of the first and second waterproof sheets of FIG. 8 with the free portion of the fabric layer of the second waterproof sheet folded down overlying the support layer of the second waterproof sheet and an overhang portion of the fabric layer of the second waterproof sheet arranged overlying a fabric layer of the first waterproof sheet.

Referring now to FIGS. 9-11, in the example illustrated, a first sheet 100a is joined to the adjacent second sheet 100b. Referring to FIG. 9, in the example illustrated, joining the sheets includes removing the release film 216 from the first sheet 100a. Referring to FIG. 10, in the example illustrated, with the adhesive tape 210 of the first sheet 100a exposed, the second sheet 100b is brought adjacent the first sheet 100a and the first end strip 222 of the second sheet 100b is joined to the second end strip 224 of the first sheet 100a via the adhesive tape 210. The free portion 220 of the fabric layer 170 of the second sheet 100b is free to be folded back to uncover the transparent first end strip 224 of the second sheet 100b. This allows an installer to assess whether the adhesive tape 210 of the first sheet 100a is properly adhered to the second sheet 100b.

Referring to FIG. 11, in the example illustrated, the overhang portion 200 of the fabric layer 170 of the second sheet 100b is laid out over the fabric layer 170 of the first sheet 100a. The overhang portion 200 extends past the support second end 188 of the second sheet 100b and across a portion of the fabric first end 174 of the fabric layer 170 of the first sheet 100a. The overhang portion 200 when laid out over the first sheet 100a directly overlies the fabric layer 170 of the first sheet 100a. The joined first and second sheets 100a, 100b present a continuous exposed fabric surface 102. One or more additional sheets can be joined to the free ends of the first and second sheets to further extend the continuous exposed fabric surface 102 of the slab guard 90.

Figure 12:
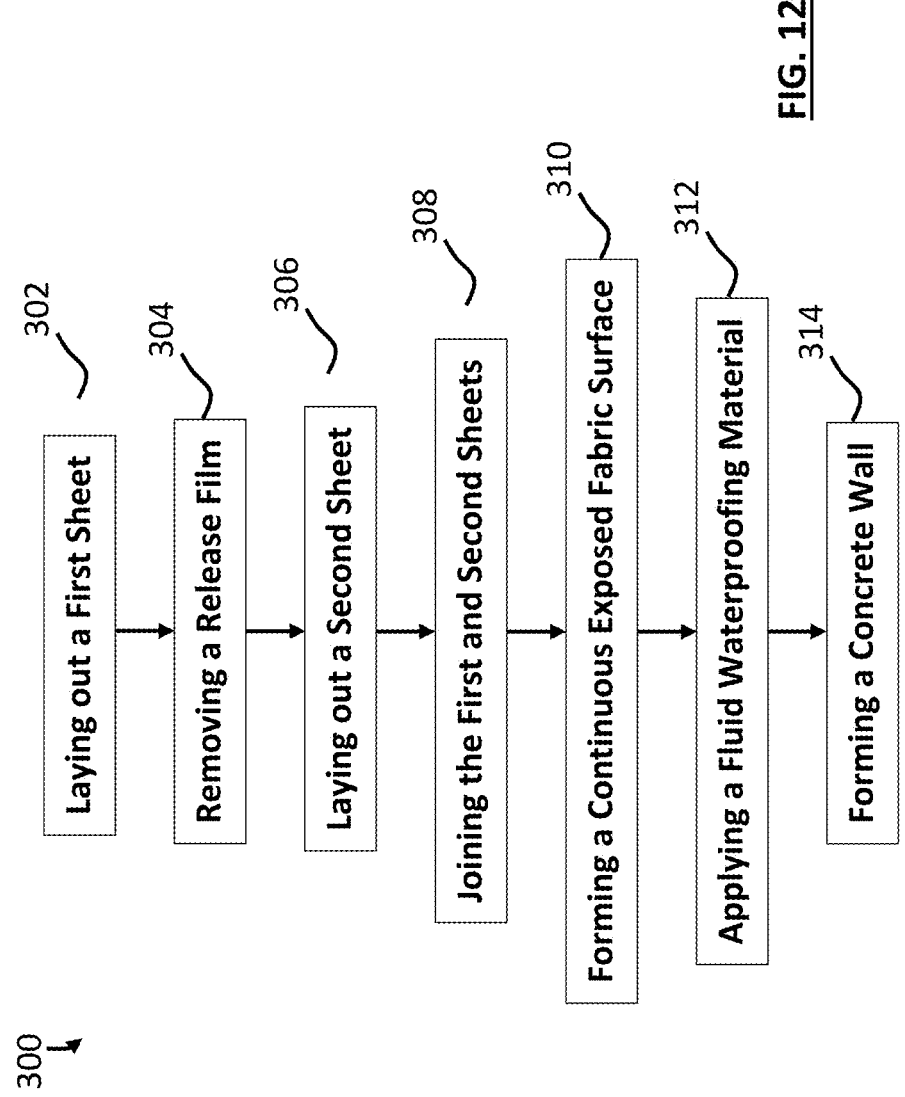
FIG. 12 is a flow diagram of a method of joining sheets for forming a waterproof slab guard.

Referring to FIG. 12, a method 300 of joining waterproof sheets to form a slab guard 90 includes, at step 302, laying out the first sheet 100a. Where the first sheet 100a includes the release film 216 over the adhesive tape, method 300 includes, at step 304, removing the release film 216.

At step 306, method 300 includes laying out the second sheet 100b adjacent the first sheet 100a. In some examples, the method 300 includes, at step 308, joining the adhesive tape 210 of the first sheet 100a to the second sheet 100b. In some examples, step 308 includes folding back the free portion 220 of the fabric layer 170 of the second sheet 100b, and applying the second end strip 222 of the second sheet 100b against the adhesive tape 210 of the first sheet. An installer may visually inspect the adhesion of the tape through the transparent second end strip 222.

At step 310, method 300 includes forming the continuous exposed fabric surface 102 extending across the first and second sheets by arranging the overhang portion 200 of the fabric layer 170 of the second sheet 100b overlapping the fabric layer 170 of the first sheet 100a.

In some examples, method 300 includes, at step 312, applying a fluid waterproofing material 130 across the continuous exposed fabric surface 102. Where the sheets 100 of the slab guard 90 are used with a pre-formed wall, step 312 includes, in some examples, laying the sheets out on a fluid waterproofing material 130 that was pre-applied to the wall (e.g., a hot rubber poured out on a generally horizontally extending wall surface). Where the sheets are used with a post-formed wall, in some examples the method 300 includes, at step 314, forming (e.g., pouring or shotcrete) a concrete wall. In some examples, step 314 includes casting the wall against the sheet while the fluid waterproofing material 130 is uncured. In some examples, method 300 includes, curing the fluid waterproofing material 130 to form the waterproof layer 132 between the fabric surface 102 and the wall 112.

What has been described above is intended to be illustrative of examples of the teaching disclosed herein, without limiting the scope of patent claims granted herefrom. The scope of such claims should be given the broadest interpretation consistent with the description as a whole.

The invention claimed is:

1. A waterproof sheet for forming a slab guard, the sheet comprising:

a waterproof support membrane having a membrane top surface extending between a membrane first end and a membrane second end opposite the membrane first end, the waterproof support membrane including a second end transparent portion at the membrane second end; and a fabric layer overlying the membrane top surface and bonded to the membrane top surface from a first location towards but spaced apart from the membrane first end, to a second location towards but spaced apart from the membrane second end, wherein the fabric layer includes a free portion overlying the second end transparent portion of the waterproof support membrane and extending from the second location to the second end, the free portion unbonded to the waterproof support membrane, and wherein the fabric layer further includes an overhang portion extending outward from the free portion beyond the membrane second end, the overhang portion for overlying the fabric layer of an adjacent sheet to provide a continuous exposed fabric surface bridging across the first sheet and the adjacent sheet.

2. The sheet of claim 1, wherein the overhang portion is a strip of fabric extending a generally constant distance beyond the membrane second end along the membrane second end.

3. The sheet of claim 1, wherein the waterproof support membrane is an extruded membrane.

4. The sheet of claim 3, wherein the waterproof support membrane is a high density polyethylene membrane.

5. The sheet of claim 1, wherein the fabric layer is a non-woven fabric layer.

6. The sheet of claim 1, wherein the fabric layer is heat-bonded to the membrane top surface.

7. The sheet of claim 1, further comprising an adhesive tape mechanically bonded to the waterproof support membrane at the membrane first end.

8. The sheet of claim 1, wherein the fabric layer is continuously bonded to the waterproof support membrane from the first location to the second location.

9. The sheet of claim 1, wherein the waterproof support membrane further includes a first end transparent portion at the membrane first end.

10. A waterproof sheet for forming a slab guard, comprising:

a waterproof support membrane having a membrane top surface and a membrane underside surface spaced apart from the membrane top surface by a membrane thickness, the membrane top and underside surfaces each extending between a membrane first end and a membrane second end opposite the membrane first end, the waterproof support membrane including a transparent portion at the membrane second end;

an adhesive tape bonded to the membrane top surface; and a fabric layer overlying the membrane top surface and bonded to the membrane top surface from a first location adjacent the adhesive tape to a second location spaced apart from the membrane second end, wherein the fabric layer includes a free portion overlying the transparent portion of the waterproof support membrane and extending from the second location to the second end, the free portion unbonded to the waterproof support membrane to be lifted away from the waterproof support membrane to uncover the transparent portion of the waterproof support membrane while an adhesive tape of an adjacent waterproof sheet is being applied to the membrane underside surface of the transparent portion.

11. The waterproof sheet of claim 10, wherein the fabric layer is continuously bonded to the waterproof support membrane from the first location to the second location.

12. The sheet of claim 10, wherein the adhesive tape is mechanically bonded to the membrane top surface.

13. The sheet of claim 12, wherein the adhesive tape is spaced from the fabric layer by an exposed strip of the membrane top surface.

14. The sheet of claim 10, wherein the fabric layer and the adhesive tape are each heat-bonded to the waterproof support membrane.

* * * * *